March 17, 1953    E. SCHIRMER    2,631,748
LABELING MACHINE
Filed June 28, 1950    6 Sheets-Sheet 3

Inventor
ERHARD SCHIRMER
By Mitchell & Bechert
Attorneys

March 17, 1953

E. SCHIRMER 2,631,748

LABELING MACHINE

Filed June 28, 1950

Inventor
ERHARD SCHIRMER
By Mitchell & Bechert
Attorneys

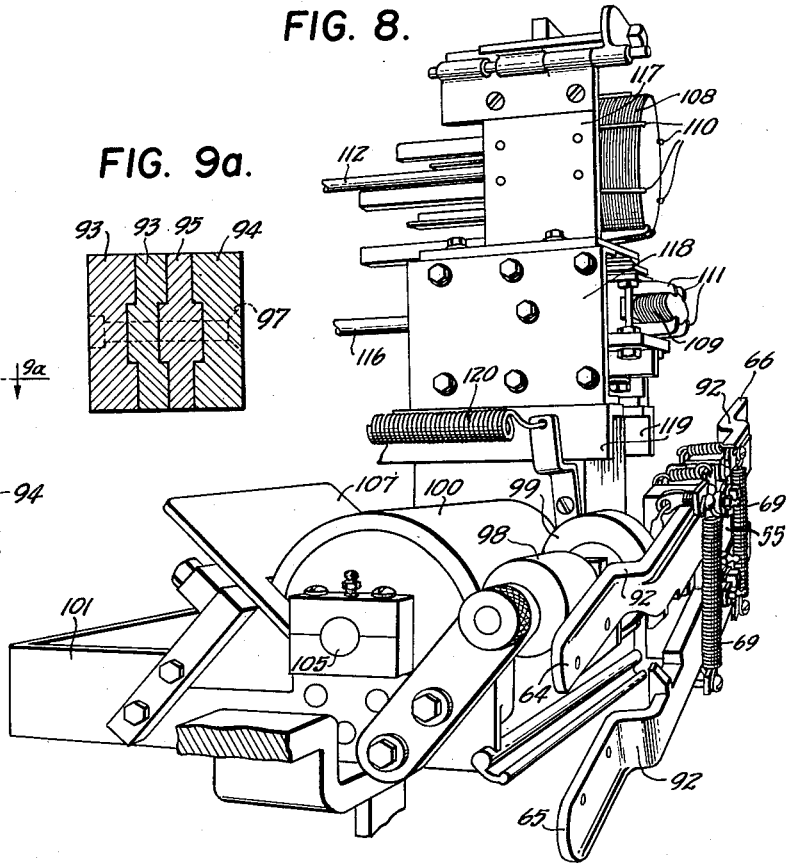

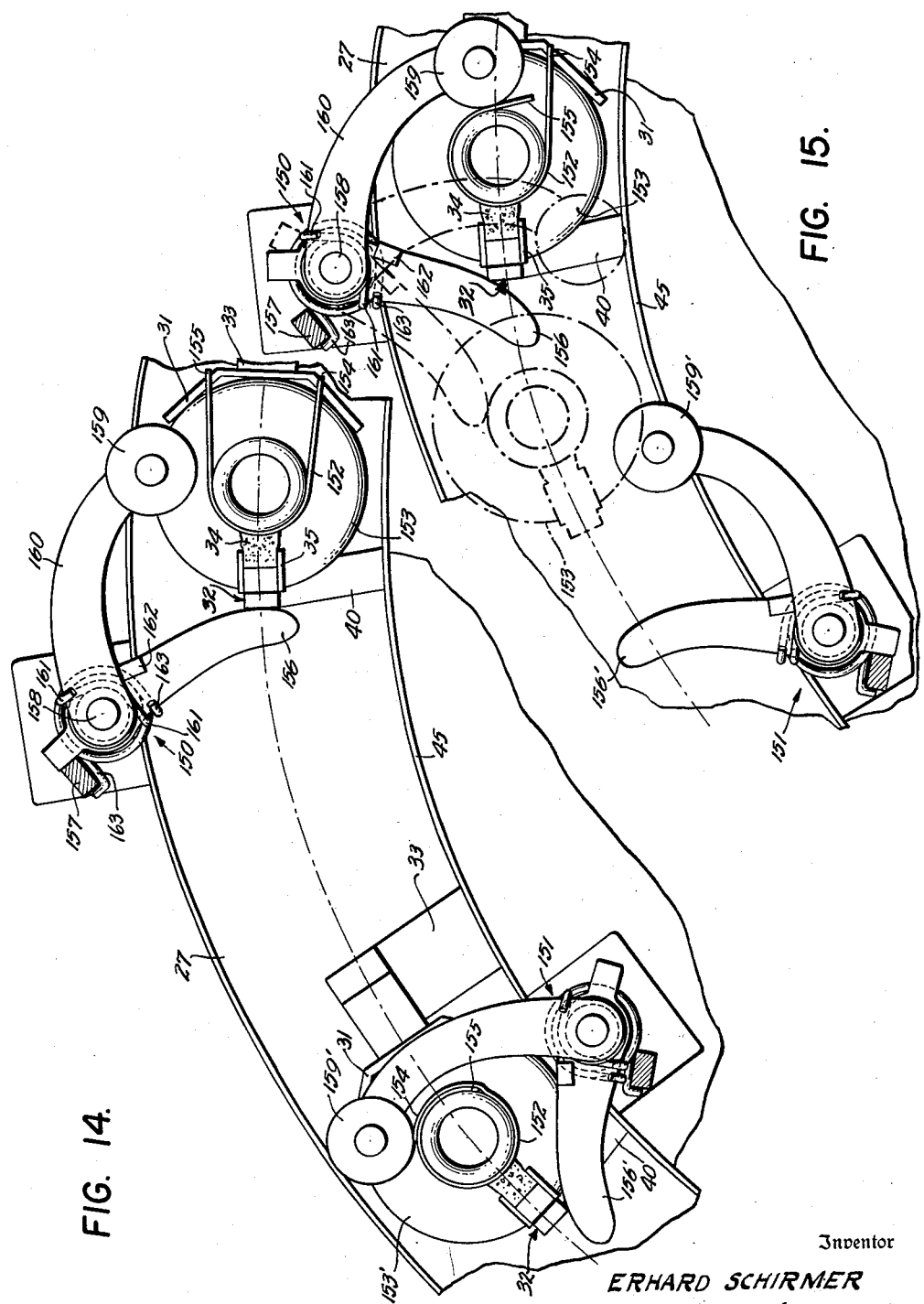

Patented Mar. 17, 1953

2,631,748

UNITED STATES PATENT OFFICE 2,631,748

LABELING MACHINE

Erhard Schirmer, Irvington, N. J., assignor to The Liquid Carbonic Corporation, Chicago, Ill., a corporation of Delaware Application June 28, 1950, Serial No. 170,799

4 Claims. (Cl. 216—13)

My invention relates to a machine for applying labels to bottles or the like.

It is an object of the invention to provide an improved labeling machine of the character indicated.

It is another object to provide an improved labeling machine which may automatically label bottles or the like at a higher rate of speed and with greater accuracy than heretofore.

It is also an object to provide a machine of the character indicated which may be readily adapted to a production-line conveyor without modification of the conveyor, and which may be quickly removed and replaced when necessary for repairs or maintenance.

It is a further object to provide an improved label pick-up and transfer means in a machine of the character indicated, for application of labels to continuously moving bottles.

It is also an object to provide improved adhesive-applying means in a bottle-labeling machine.

Another object is to provide an improved labeling machine wherein a label may be picked up from a magazine or other source of supply, at the same time as another label is being applied to a bottle.

It is a specific object to provide a machine of the character indicated wherein neck labels having overlapping ends may be accurately placed and cleanly applied.

Another specific object is to provide an improved labeling machine wherein neck and body labels may be applied simultaneously to the same bottle in consistently accurate desired orientation with respect to each other and with respect to the bottle.

It is a general object to provide a machine of the character indicated in which there may be a more accurate and positive handling of the labels and of the bottles, whereby uniformly clean and accurately aligned labeled bottles may be produced.

Other objects and various further features of novelty and invention will be pointed out or will occur to those skilled in the art from a reading of the following specification in conjunction with the following drawings. In said drawings, which show, for illustrative purposes only, preferred forms of the invention:

Fig. 8 is a fragmentary view in perspective showing certain parts of the gluing means and of the label-magazine-feeding means of the machine;

Fig. 9 is an enlarged fragmentary side view of a modified label-supporting means of the invention;

Fig. 9a is a sectional view in the plane 9a—9a of Fig. 9;

Fig. 13 is a program chart including some cam profiles, illustrating coordination of functions between the several mechanisms of the machine, over a period extending from one label application and until the next succeeding label application;

Fig. 14 is an enlarged fragmentary plan view of a neck-label-wiping mechanism incorporating features of the invention, two successive bottles being shown in exaggerated proximity for purposes of more clearly illustrating functions of the mechanism;

Fig. 15 is a view of the mechanism of Fig. 14, but with the parts in a different relationship.

Figure 1:
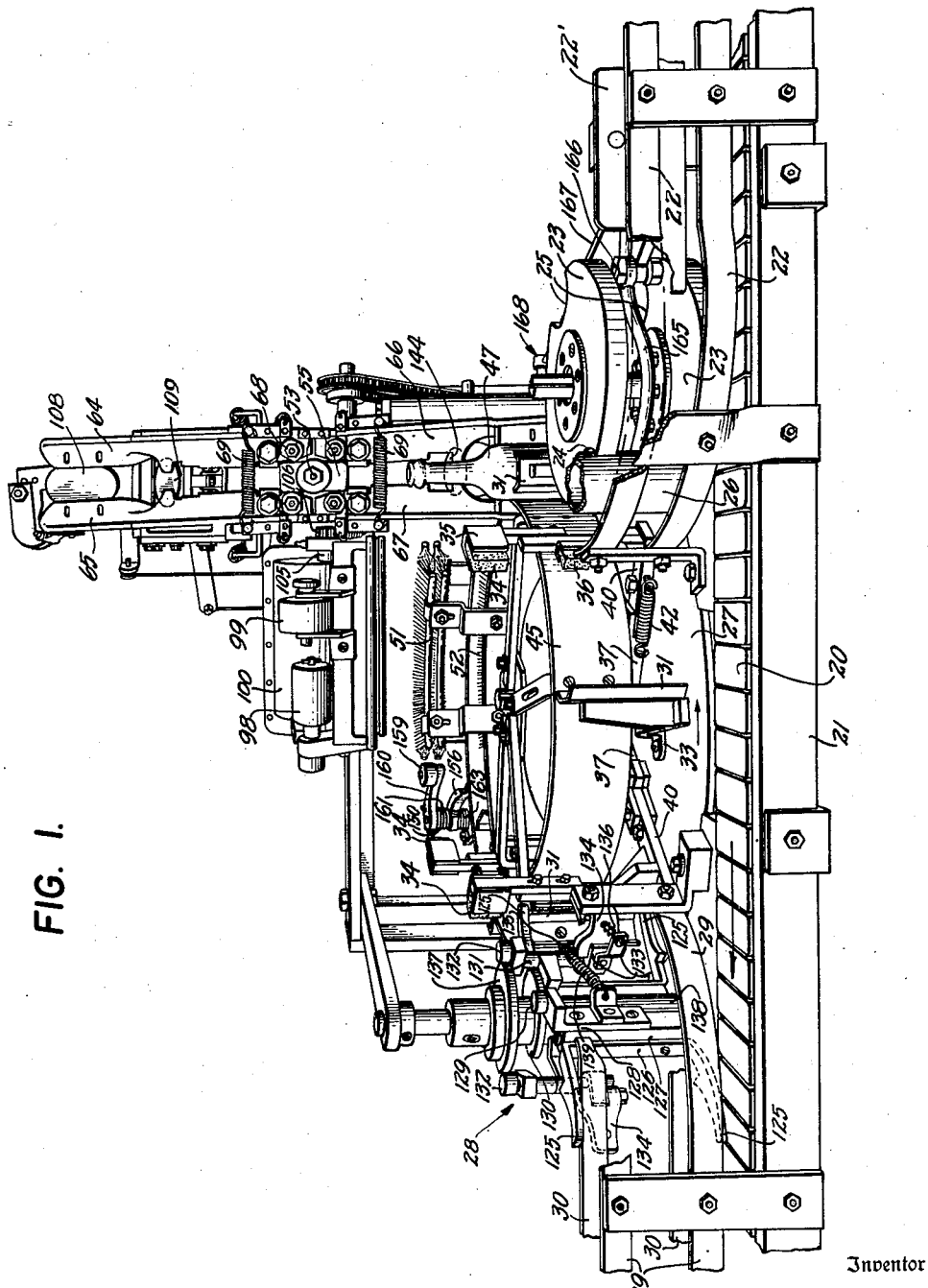
Fig. 1 is a front view in perspective of an automatic bottle-labeling machine incorporating features of the invention.

Briefly stated, my invention contemplates an improved bottle-labeling machine wherein labels may be applied more quickly and with greater alignment accuracy than heretofore. In a preferred form, my invention achieves these results by employing a label-transporting mechanism which may be effective to apply one or more labels to one bottle, while picking up and gluing one or more labels for application to the next bottle in the production line. The label-transporting means may be indexible, and at each indexed position the labels may be held stationary with respect to the bottle which is to receive the labels while the labels are being transferred; during this stationary period of label-transfer further labels may be picked up, for application to the next bottle to be labeled. Once the labels are transferred to the bottle, I provide means which may positively hold the labels in place for a prolonged period; during this period, there may be a substantial wiping of the edges of the labels so as to assure good adhesion to the bottle and accurate label placement on the bottle. Once the label is transferred to the bottle, the label-transporting means may quickly retract out of the way of the bottle and may proceed through an indexing operation, so as to bring the next labels into position for application to the next bottle in the production line. During the indexing interval, glue may be applied to the label-supporting means so that, when it arrives at the label feed-out position, the newly fed labels may automatically receive a proper application of glue.

My machine includes a number of features rendering the same readily adaptable to the application of one or more labels to bottles or the like, of one or more different sizes and shapes. No matter what the size or shape of the bottle, my machine may with equal assurance hold newly applied labels in place until completely wiped onto the bottles. In the event that oversize labels are to be used, as in the case of neck labels with overlapping ends, I have provided novel means for automatically wiping the ends successively so as to produce a clean and neat label application. My machine incorporates means for preventing the feeding of labels if for any reason the supply of bottles along the production line should end or should be interrupted. Also included is a novel bottle-ejection mechanism to remove labeled bottles from my machine and to place them properly on the production-line conveyor.

Referring to the drawings, my invention is shown in application to a machine which may be readily removably applied to a bottle-conveyor line 20. The conveyor 20 may run from right to left in the sense of Fig. 1 and may be supported in guide means 21. My machine is preferably installed on one side of the conveyor line 20, so that the entire assembly of my machine may be skidded into place alongside the conveyor 20; curved guide rails 22—22' may be employed to guide the bottles to the machine side of the conveyor 20. For a proper sorting and timed entry of bottles into the labeling machine, I provide a sorting wheel 23 which may be recessed at a plurality of spaced points, as at 24—25, in order to receive one bottle 26 at a time and to feed the same into the machine.

In the form shown, all labeling operations are performed while the bottles are on a turntable 27, and turntable rotation may be continuous and in timed relation with rotation of the sorting wheel 23; thus, labels are applied by my machine to continuously moving bottles, without the need for even a temporary interruption of the flow of bottles. After label application, a bottle-ejection mechanism 28 may grasp each bottle, remove the same from the turntable 27, and place it on the conveyor 20 before releasing it to continue off the left end of the machine (as viewed in Fig. 1). Guide rails 29—30 may serve to steady and to guide the labeled bottles after they have been replaced on the conveyor 20.

As indicated generally above, I prefer to maintain positive positioning control of the bottles at all times. While on the turntable 27 the bottles may be positively supported regardless of small variations in bottle size. For the form shown, supporting means for bottles are provided at five stations spaced around the turntable 27 (see Figs. 1 and 10). Each supporting means may include a fixed support 31 and a movable support 32. The fixed support 31 preferably receives the bottle on the side opposite from that on which the label or labels is to be applied. The fixed support 31 may comprise an upstanding generally arched member to provide lateral and back support for a bottle, and, for a purpose which will later be clear, the fixed support 31 is mounted upon a bracket 33 anchored to the turntable 27 at a location somewhat radially inward of the point of bottle support; thus, at the location of bottle-support the fixed member 31 may be spaced above the floor of the turntable 27.

For each bottle station, the movable support 32 may comprise resilient foot or pad 34 supported on an upstanding member 35 and to be squeezed against the bottle. There is preferably one such pad 34 for each label to be applied to a bottle; thus, for the form shown, in which both neck and body labels are to be applied simultaneously, there may be a neck pad 34 and a body pad 36 for each of the movable supports 32. It will be understood that the upper and lower pads 34—36 may be adjustable relatively to each other in accordance with the dimensions and proportions of the bottles to be labelled. Each of the supports 32 may be flexibly mounted upon an arm 37, pivoted with respect to the turnable 27 and on a vertical axis; the arm 37 may include follower means 38 to follow a cam program 39 determining placement of the support means 32. The cam 39 and turntable 27 may be relatively movable, but in the form shown cam 39 is stationary so that cam-generated movement of the arm 37 occurs upon turntable rotation. In order that the movable support means 32 may be adaptable to bottles of various diameters, the arm 37 itself may be flexible and in the form shown carries a further arm 40, pivoted at 41 to the arm 37, so that the upstanding part of support 32 may be mounted upon or formed as a part of arm 40. Resilient means, such as a tension spring 42, between the two arms 37—40 may normally urge the outer arm 40 in a clockwise direction (in the sense of Fig. 10) relatively to the inner arm 37, and cooperating abutments (not shown) on the arms 37—40 may limit movement by spring 42 to a relationship as shown for the unoccupied bottle station in Fig. 10.

Figure 10:
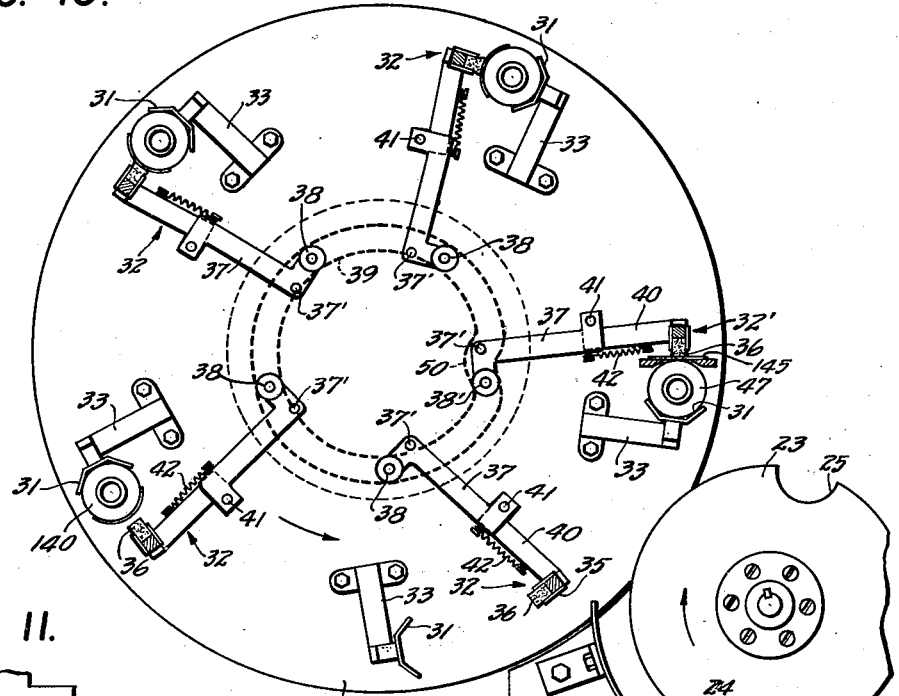
Fig. 10 is a partly schematic view seen from the same aspect as in the case of Fig. 3, certain parts being removed in order better to illustrate the bottle-supporting mechanism.

The program of cam 39 may be such as in effect to advance the movable support means 32 relatively to the fixed support means 31 just before release of a labeled bottle, and to provide a maximum space for the reception of a new bottle when the new bottle 26 is introduced onto the turntable 27; from inspection of Fig. 10, it will be clear that the bottle 26 may be placed in the space between pad 34 and the fixed support 31 with safe and ample clearance. Once on the turntable, the bottle may be picked up by the fixed or back support 31, and a resilient friction shoe 44 (see Fig. 3) may serve to steady or to hold the bottle in this position until cam 39 has caused the movable support 32 to bear against the otherwise unsupported side of the bottle. A fixed guard rail or fence 45 may provide a sufficient backing for the friction shoe 44, so that, when the bottle is brought into the label-applying position, the bottle may be well supported on all sides. In the form shown, the shoe 44 is resiliently urged by compression spring 46 into the bottle-intercepting position; once a bottle is thus intercepted, the spring 46 may resiliently load the bottle in a known and well-defined radial position for accurate label transfer, as will be clear.

Figure 3:
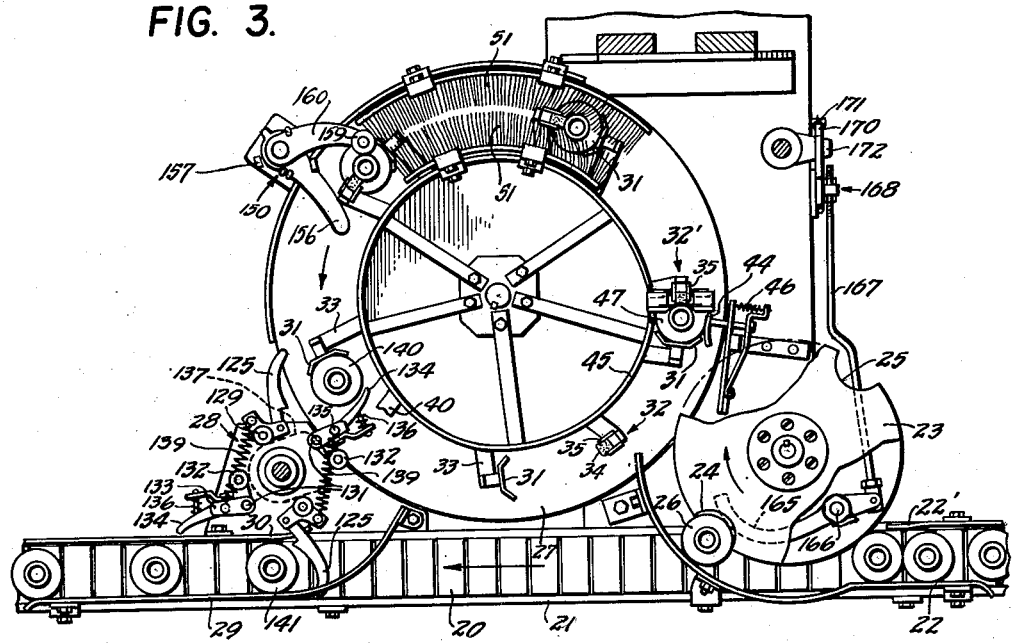
Fig. 3 is a plan view of certain parts of the machine, as viewed more or less from the plane 3—3 of Fig. 2.

Once the bottle is on the turntable 37, it is immediately brought into the label-applying position, and in Figs. 1, 3, and 10 a bottle 47 is in the label-applying position. It will be noted that, in the relation shown in Fig. 10, the cam follower 38', as well as the movable support 32' therefor, is in the process of descending from the high point to the low point of the cam 39. The extent of this descent may be more than enough to produce contact of pads 34—36 (pad 34 being omitted for clarity) with the bottle 47; to the extent of the excess available cam-induced motion of arm 37, the spring 42 may preload or squeeze the bottle between its supporting means 31—32. The cam 39 may include a dip 50 following the drop from the high point, and this dip will be understood to produce more than the usual preloading squeeze on the bottle. This unusually great squeeze need only be temporarily applied, and, as will later be clear, I provide this greater squeeze essentially only for the instant of label transfer from the label-transporting means to the bottle. From the time of label transfer and until substantially the instant of bottle removal from the machine, the cam 39 may include a dwell 39', effective to maintain substantially uniform supporting pressure on the bottles during this period. During this period, the ends of the labels may be wiped onto the bottles, as the bottles are carried along with movement of the turntable; label-wiping may be accomplished by upper and lower banks 51—52 of opposed arcuately extensive stationary brushes to intercept and wipe both sides of both labels.

In accordance with the invention, I provide novel means for picking up and transporting a label to the point of label transfer to a bottle. This novel means includes an indexing mechanism permitting a label (or labels) to be transferred to a bottle while the label (or labels) for the next bottle is being picked up in readiness for application. The label-transporting means may be rotatable about an axis 53 (Fig. 1) generally perpendicular to the bottle axis, and the label-transporting means may also rotate substantially in a plane close to the plane including the bottle and the turntable axis. The transporting means may include a plurality of angularly spaced label-supporting means, and for the form shown I provide two such label-supporting means. Each of the label-supporting means may be carried on the same hub 55 mounted upon an indexing shaft 56 rotatable on the axis 53.

Indexing movement for the shaft 56 may be derived from any convenient source of power, as from a shaft 57 appropriately geared in a box 58 to drive an indexing arm 59. In the form shown, the arm 59 carries two diametrically spaced Geneva arms having rolls 60 successively engageable with slots in a Geneva wheel 61. Geneva-wheel movement may be imparted to the indexing shaft 56 via a set of transmission gears 62 which may be changeable as desired in accordance with the program of operation. It will be understood that the indexing and gear relationships may be such as to provide a stationary orientation of the label-supporting means while one such supporting means is in a label-applying position and while the other such supporting means is in a label-receiving position, and that, after these functions have proceeded simultaneously, indexing may proceed promptly so as to bring the new label or labels down to the applying position and so as to position the empty label-supporting means for reception of a new label or labels. If desired, locating means may be employed to hold indexed positions of the label-supporting means 55; such locating means may include a disc 175 (Fig. 2) peripherally recessed at diametrically opposite locations, with a locating arm 177 urged by a spring 176 to hold a roll 177 against the periphery of disc 175, ready to intercept one of the recesses to hold an indexed position.

Referring particularly to Figs. 1, 8, 11, and 12, each label-supporting means may include two generally parallel spaced arms; arms 64—65 defining one supporting means, and arms 66—67 the other supporting means. Each of said arms 64 to 67 may be independently pivotally supported by the hub 55, as in spaced pivot pins 68; thus, when desired, one arm of a particular supporting means may be spread relatively to the other, or both arms may be spread simultaneously. Normally, for each label-supporting means, the arms may be generally parallel to each other, and spreading may be effected only when it is desired to release a label for transfer to a bottle. Thus, tension-spring means 69 may normally urge pairs of arms (64—65, 66—67) of the supporting means toward each other, and adjustably fixed stops or abutments 70 on the hub 55 may provide a limiting "closed" relationship for the support arms (64—65, 66—67).

In transferring a label to a bottle, the arms may be spread, as upon a longitudinal thrust of the wedge member 71 between follower members 72 carried on each of the label-supporting arms (64—65, 66—67); but this spreading means need only be effective for the pair of label-support arms which happens to be at the label-applying position. In the form shown, the follower members 72 are adjustably carried by the respective label-supporting arms, and lock-nut means 73 may serve to secure a desired placement of the follower members 72. The wedge member 71 may be longitudinally slidable below the index axis 53, and may be formed at the end of a slide rod or bar 74 (see Figs. 2, 11); spring means 75 may urge the bar 74 normally for retraction, into a clearance relation that will permit an indexing of the label-supporting means. The feeding stroke of the arm spreader or wedge 71 may be governed by a cam 76 driven by an appropriately geared power take-off 77 from the gear box 78. A roll 79 may follow the cam 76 to crank a feeding arm 80 for the slide 74. It will be clear that the program of cam 76 and its speed of rotation may be such that the spreader nose 71 is only fed forward to engage the follower members 72 when a particular supporting means, such as the supporting means 66—67, is in position to transfer a label to a bottle; at the same time, this feed of the spreader nose will be understood to have no effect upon the support members 64—65 which may be in the upper or label-receiving position. When the hub 55 and the supporting members carried thereon have been indexed so as to place the support members 64—65 in the down or label-applying position, it will be clear that the spreader means 71 may then be effective to spread the arms 64—65 in order to effect transfer of another label to another bottle.

In order to avoid the possibility of losing control of a label during indexing, and for other purposes which will later be clear, I prefer that means be employed positively to hold the label-supporting means 64 to 67 against spreading except for the relatively short interval of time during which spreading is desired. For this purpose, I may employ locking or dogging means to hold the members of each pair of supporting arms against spreading, and the locking or dogging action provided thereby is preferably effective continuously, except for the time of label-transfer to a bottle (i. e. the arm-spreading period).

Figure 11:
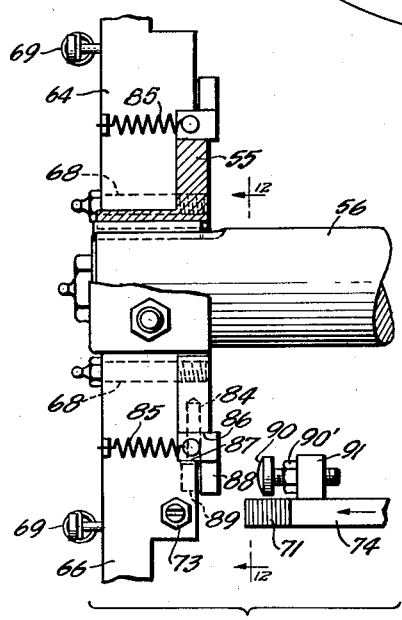
Fig. 11 is an enlarged fragmentary side view, partly broken-away and in section, showing a portion of the label-supporting means.
Figure 12:
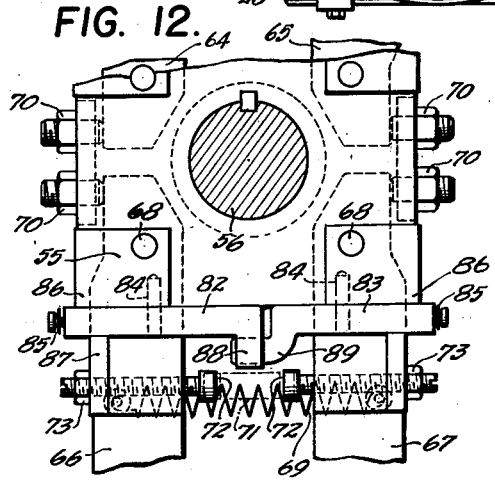
Fig. 12 is a view taken substantially in the plane 12—12 of Fig. 11.

Referring to Figs. 11 and 12, it will be seen that, for each pair of label-supporting arms (e. g. 66—67), the locking or dogging means may comprise two dogs 82—83 pivotally carried by the arms (64—65, 66—67, respectively) as by means of pins or studs 84. At their outer ends, the dogs 82—83 may be spring-stressed, as by means of springs 85, against one of the supporting arms 66—67; when in the normal position against one of the arms 66—67, the dogs 82—83 may lie between spaced abutment shoulders 86—87 on the hub 55 and on the supporting means 66—67, respectively. The inner adjacent ends of the dogs 82—83 may include offset and overlapping portions 88—89 positioned to receive abutment by a nose 90, which may be mounted on the spreader means 74; in the form shown, the nose 90 is adjustably mounted in a block 91, and lock-nut means 92 may serve to hold a given longitudinal adjustment of the nose 90 relatively to the spreader wedge 71.

It will be clear that, upon a feeding advance of the spreader means 71—74, the nose 90 may first intercept one of the overlapping offset ends 88—89 of the dogs 82—83, and that further displacement may serve to remove the dogs 82—83 from dogging position, thereby making possible a spreading of the arms 66—67, as urged by contact of follower members 72 with the spreader nose 71. Upon retraction of the spreader means 71—74, it will be clear that spring 69 may return the support arms 66—67 to their normal substantially parallel relation, whereupon the springs 85 may reset the dogging mechanism 82—83 so as to prevent further spreading of the arms 66—67.

It has been mentioned that my machine may be applicable to the labeling of bottles with one or more labels, more or less regardless of the shape of the bottle. If the neck label and a body label are to be applied simultaneously, then it may be desired to support a neck label and a body label in mutually offset relation, in accordance with the extent to which the neck may be offset from the body of the bottle. Thus, in a preferred form, each of the label-supporting arms 64—65—66—67 may include a radially inner or neck-label-supporting portion and a radially outer or body-label-supporting portion. These two portions being offset from each other, as at 92 (Fig. 8), in accordance with the offset of the neck from the body on the bottle.

If the machine is to be used interchangeably (as from one day's run to the next day's run) on tall and on so-called "steinie" bottles, then the desired offsets may vary, and in Figs. 9 and 9a I show a supporting-arm construction wherein the offset may be selected as desired. In the arrangement of Fig. 9, a supporting arm includes a radially outer section 93 to receive a body label and a radially inner section 94 to receive a neck label. These two sections may be removably secured to each other at an adjustable offset portion, and I have shown two spacers 95—96 to produce the offset shown. To maintain alignment of all parts of the arm, each of the arms 93—94 may be grooved longitudinally, as shown in Fig. 9a, and the spacers 95—96 may include appropriate shoulders and grooves so as to provide an angularly tight keyed relationship of the two arms 93—94 regardless of their offset relation. Clamping bolts or screws 97 may secure the arm assembly once the desired assortment of spacers 95—96 has been inserted between the arms 93—94. Thus, it will be seen that adjustment of the arm offsets may be a simple matter in setting up the machine for the labeling of a particular kind of bottle.

It has been indicated that, in order to effect a saving of time, I prefer to apply adhesive or glue to the supporting means 64—65, 66—67 during an indexing of the mechanism. In the form shown (see Fig. 8 in particular), glue may be applied to the back of the supporting arms 66—67 and 64—65, in turn, after each of these supporting means has transferred a label to a bottle and before each of these supporting means is brought to the label-feed-out position. Glue application may be effected by means of rollers, and I have shown a roller 98 of one radius and a roller 99 of another radius; rollers 98—99 may rotate on different centers so that they may both uniformly wipe a wetting roll or drum 100, and the diameter difference between rolls 98—99 may equal the offset 92 so as to permit uniform wiping of the two differently offset label-supporting portions of the supporting arms 64—65, 66—67, as such arms pass by the rollers 98—99 during the indexing process. The rollers 98—99 may be continuously and uniformly wetted with glue or with other means to make the labels suitably adhesive, as by continuously driving the drum 100 in a glue bath or reservoir 101. Drive to the drum 100 may be effected via sprocket take-off 102 from the main camshaft 103, and the sprocket may drive a jack shaft 104 to the drum shaft 105 via gear means 106. A scraper plate 107 may be employed to assure a uniform layer of glue on the wetting roller 100.

Figure 2:
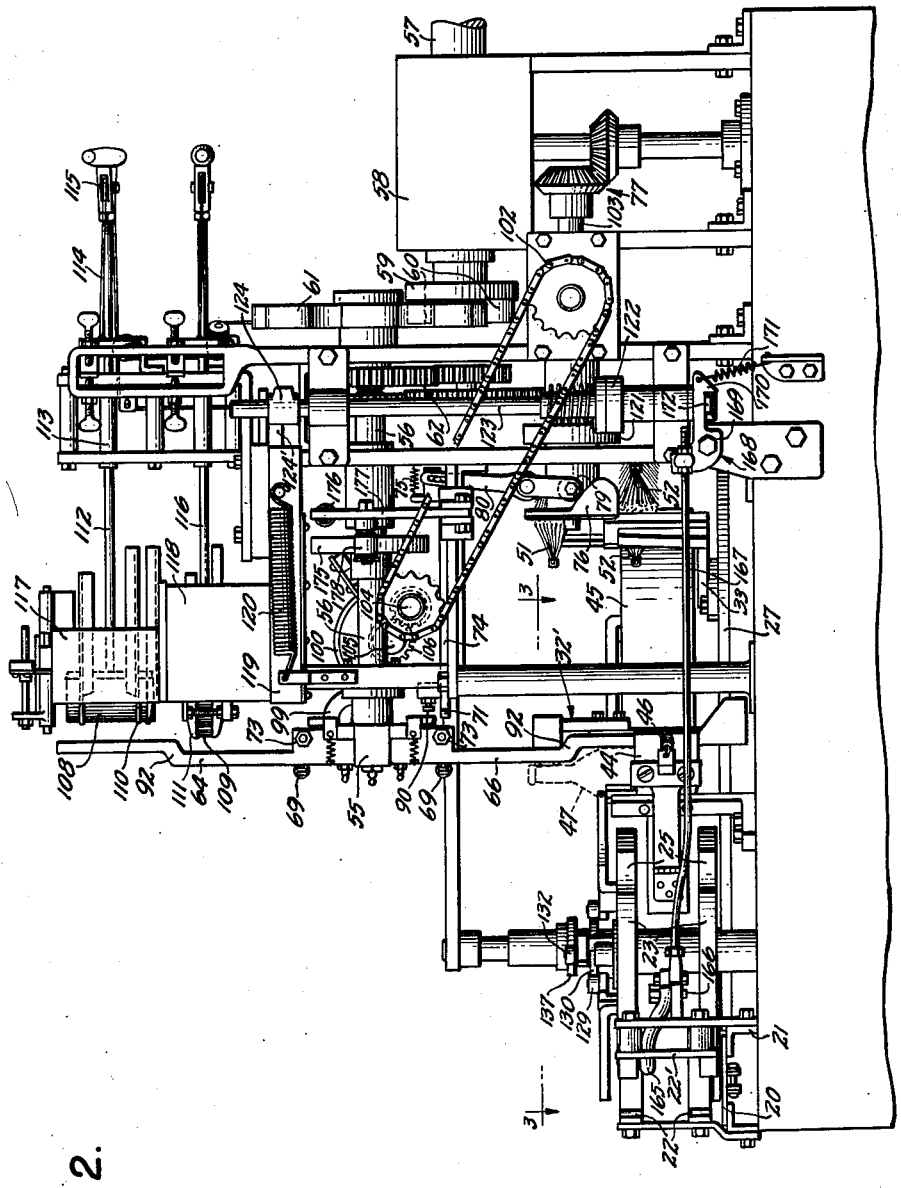
Fig. 2 is a right-end view of the machine of Fig. 1.

In accordance with a feature of the invention, a plurality of labels may be simultaneously applied to the appropriate supporting means 64—65 or 66—67 in properly offset relation. Referring to Figs. 2 and 8, it will be seen that, for this purpose, I have provided a first magazine 117 for the supply of body labels 108 and a second magazine 118 for the supply of neck labels 109. In each case, the labels may be supported by four guide fingers 110—111, respectively, having slightly hooked-over ends to guard against premature loss of labels. In each magazine, the charge of labels may always be held in a forward position by suitable loading means; for the body labels 108, I have shown a thrust plunger or rod 112 slidably guided in a sleeve 113, and loaded by means of a weight (not shown) on a cable 114 suitably trained over sheaves including a pulley 115 at the end of the thrust rod 112. A similar weight-loading mechanism may be employed for the case of the thrust rod 116 for the neck labels 109.

Label magazines 117—118 may be mounted on a label-feed carriage 119 slidable on the frame of the machine and spring-urged, as by means of springs 120, in the forward direction. Label-carriage retraction may be effected in accordance with the program of a cam 121 on the main camshaft 103. Follower means for the cam 121 may include a crank having a boss 122 keyed or otherwise secured to a jack shaft 123, journalled in the frame and extending generally vertically upward. The boss 124 of another crank may be keyed to the upper end of the shaft 123, and this upper crank may be connected, as by a thrust link 125, to the label-feed carriage 119.

With a properly synchronized setting, it will be clear that the cam 121 may permit an advance of the label-feed carriage 119 only when a pair of label-supporting arms (64—65) is poised to receive a label or labels. The arms 64—65 will have just been wetted with glue on the side facing the label magazines, and upon a feed-out of the label carriage 119, the forward label in each of magazines 117—118 will be forced into firm contact with the glue on the arms 64—65. Thus, upon retraction of the label-feed carriage 119, each of the forward labels will be left stuck to the supporting arms 64—65 in readiness for the indexing operation to bring these labels in position for application to the next bottle to be labeled.

Also, in accordance with the invention, I have provided a novel means 28 of firmly and accurately clasping a labeled bottle in order positively to remove the same from the turntable 27 and to place it once more on the conveyor track 20. As will be seen from Figs. 1 and 3, the means 28 may include two supports for each of two bottle-supporting positions, so that a bottle may be removed from my machine and replaced on the conveyor 20 once for each half-revolution of the means 28. One of these supports may comprise two vertically spaced parallel arms 125, appropriately curved and cupped so as to provide locating support for the back of a labeled bottle. The two arms 125 may be bent out of the same strip of material so as to be of generally U-shape as shown in Fig. 1, and the central or yoke portion 126 thereof may be secured to a block or base 127 pivotally supported on a rotating hub 138. The upper and lower arms 125 will be understood to provide vertically spaced support of a bottle, and the spacing between these arms 125 may exceed the effective height of the fixed bottle supports 31; thus, in a transfer of a bottle off the turntable 27, the lower arm 125 may pass under support 31 and above the turntable while the upper arm 125 may catch the bottle above the support 31. For actuating purposes, the block 127 may carry a bracket 128 to support a cam-follower roll 129, and the roll 129 may ride a cam 130 fixed against rotation.

The other support for use in removing a labelled bottle may be of a flexible nature, and may be pivotally mounted on a pin 131 carried by the same hub 138 as is the block 127. Angular movement of the pin 131 may be governed by a cam-follower roll 132, and the support arm itself may include a radially inner part 133 and a radially outer part 134 pivoted to each other, as at 135. A spring 136 between the two support parts 133—134 may normally urge the support part 134 in a direction to close or confine the spacing between support arms (125—134) for one of the support positions of the bottle-ejection means 28. The cam follower 132 may follow a stationary cam 137, and spring means 139 may serve to preload adjacent cam followers 129—132 on the cams 130—137.

It will be clear that, as the ejection means 28 rotates in timed relation with turntable rotation (2.5:1, for the arrangement shown), a pair of ejection arms 125—134 may be brought to grasp a labeled bottle 140 just as the movable support for that bottle (140) is beginning to release the bottle 140 (see also Fig. 10). The cams 130—137 may serve to hold the arms 125—134 clamped upon the bottle 140 as the hub 138 of ejection means 28 rotates, and thus the bottle may be transported onto the conveyor track 20. Upon placement of the bottle on the conveyor track, as in the case of the bottle 141 (Fig. 3), cams 130—137 may cause the arms 125—134 to separate quickly, so as to free the bottle for complete control by the continuous advance of the conveyor 20.

Operation of the machine

The cooperation between parts of my machine may be better understood from a description of a cycle of operation. Ordinarily, in the production-line use of the device, a steady stream of bottles or other items to be labeled will be fed toward the machine, between the guide rails 22—22' and along the conveyor 20. One by one, these bottles will be picked up by the feed wheel 23, for a properly timed entry onto the turntable 27. It will be understood that, when a bottle such as the bottle 26 is placed upon the turntable 27, the support means 31—32 which is to clamp the bottle in place on the turntable will be opened so that the bottle may be readily received (see the upper program for grip-finger 32' feed in Fig. 13). The turntable 27 will be continuously rotating, and by the time that the bottle 26 has reached the labeling position (shown in Figs. 1, 3, and 10 for the bottle 47), the feed wheel 23 will have picked up another bottle from the production line.

Figure 4:
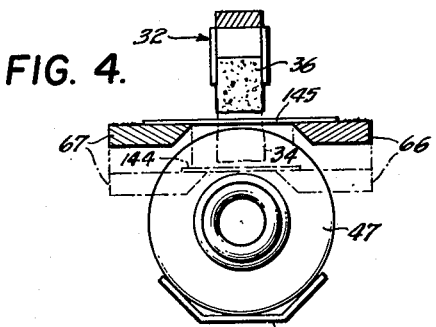
Fig. 4 is an enlarged, simplified, fragmentary, plan view of a bottle to which labels are about to be applied, the label-supporting means being shown in section at the location of body-label support and in phantom at the location of neck-label support.
Figure 5:
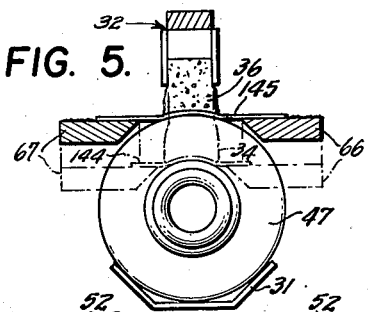
Fig. 5 is a view similar to Fig. 4 as the labels first touch the bottle, and at an instant just before release of the labels from their supporting means.

Just before the bottle reaches the labeling position, the label-supporting means 66—67 will have been indexed to the position shown in Fig. 1, as by a clockwise rotation (in the sense of Fig. 1), and a neck label 144 and a body label 145 will be held in place just ahead of the bottle 47 (see Fig. 4). The turntable 27 will at all times continue to rotate and to carry the bottle 47 toward and into contact with the labels 144—145. At the same time, the pads 34—36 of the movable bottle-support member or grip finger 32 will be cammed into resilient compression of unsupported parts of the labels 144—145 against the neck and body portions of the bottle; in Fig. 13, the extent of resilient preload of grip finger 32 against the labels on the bottle is indicated by a dotted line which departs the solid-line curve once the labels first touch the bottle. The label portions thus squeezed against the bottle will not have been glued, but the bottle support will be understood to maintain accurate placement and alignment of the labels on the bottles. In Fig. 5, I show this relation at the time when the movable support means 34—36 has compressed the labels 144—145 against the bottle 47.

Figure 6:
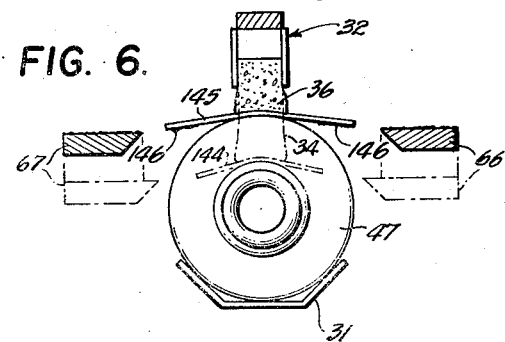
Fig. 6 is a view similar to Fig. 5, showing the parts just after release of the labels from the supporting means.
Figure 7:
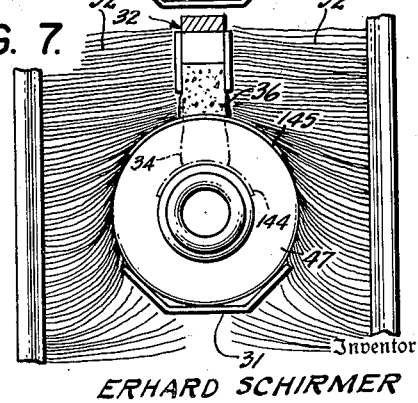
Fig. 7 is a view similar to Fig. 6 showing the parts as the labels are being wiped onto the bottle.

Next, the cam 76 may be effective to project the spreader nose 71 for spreading the label-support arms 66—67 apart, as shown in Figs. 6 and 13. This spreading operation will be accompanied by a complete release of the labels 144—145 from the support arms 66—67, and the glued ends 146 of the labels will be suspended in mid-air. The lateral extent to which the arms 66—67 are spread apart, and the period over which they are kept apart, are preferably sufficient to allow the bottle 47 to pass completely between the arms 66—67, so that the arms 66—67 need never touch a bottle. Immediately after the bottle 47 clears the label-support arms 66—67, the spreader cam 76 may drop so as to allow the arms 66—67 to come together again and to lock in their normally closed position.

While the labels 144—145 were being transferred to the bottle 147 during the spreading and closure of label-support arms 66—67, the glue-moistened upper label-support arms 64—65 were receiving another pair of labels from the stacks 108—109 in magazines 117—118 (see lower program of Fig. 13). The label-carriage feed cam 121 was effective to project the label carriage 119, and the front or outwardly exposed label in each magazine is firmly pressed against the glue-moistened side of the label-support arms 64—65. Upon completion of the label-carriage feed-and-retraction cycle, the indexing means may be effective quickly to rotate the label-support mechanism 64—65—66—67 in a clockwise sense, as viewed in Fig. 1, thus placing the label-charged arms 64—65 in the down-position, in readiness for application to the next bottle. During the indexing process, the label-support arms 66—67 which have just discharged their labels will pass by the glue-moistened rollers 98—99 to receive a fresh and uniform charge of glue, so that new labels may be picked up during the next label-carriage feed cycle.

After transfer of labels 144—145 to the bottle 147, the bottle-support means 34—36 preferably maintains pressure on the labels, and the turntable 27 continuously advances the bottle through the brushing means 51—52. The brushes 51—52 will be understood thoroughly and efficiently to wipe both labels so that, upon emergence from the brush assembly, both labels will be thoroughly pasted down, at least for the parts thereof which extend substantially no further than half way around the bottle. If the bottle labels are to extend no further than half-way around the bottle, then no further operations are called for, except a proper release of the bottle from the support means 31—34—36 and a proper engagement of the ejection-support means 125—134 with the bottle in order to transport it off the turntable 27 and to return it to the conveyor 20.

If the bottle labels are to extend further than half-way around the bottle, as is sometimes the case with neck labels, then I provide novel wiping means which may be operative between emergence of the bottles from the brushes 51—52 and entry into the ejection mechanism 28. This novel label-wiping mechanism may employ wiper rollers of resilient material. In Figs. 14 and 15, I show two such wiping mechanisms 150—151 mounted on opposite sides of the path of the bottles and arranged successively to wipe the two ends of the wrap-around label, which may be the neck label 152 (for the sake of clarity, only the wiper mechanism 150 is shown in Figs. 1 and 3). As noted above in the description of figures, Fig. 14 shows successive bottles 153—153' in exaggerated proximity, in order that the successive operations performed by both mechanisms 150—151 may be evident from the same figure.

At the right-end of Fig. 14, I show a bottle 153 just after emergence from the brushes 51—52 with the neck label 152 only partially pressed in place, so that the two ends 154—155 are as yet unapplied to the bottle. In encountering the wiper mechanism 150, the upright of the movable support 32 for the bottle 153 may first strike an actuator arm 156 normally held by torsion-spring means 163, stressed counterclockwise, as against a fixed abutment 157. Forward motion of the turntable 27 (and, therefore, of bottle 153) may serve to crank the actuator arm 156 in the clockwise direction about the point 158 of pivotal support. As indicated, the wiper mechanism may further include a wiper roller 159, which may be of resilient material, such as soft rubber, mounted at the end of a wiper arm 160; the arm 160 may swing on the same pivot 158 as the actuating arm 156. Again, torsion spring means 161 may cooperate between the actuating arm 156 and the wiper arm 160 to hold a preset position, as by having the arm 160 rest against a stop or abutment 162 on the actuator arm 156.

With the described construction, it will be understood that the forward motion of the bottle 153 may, in cranking the arm 156, also crank the wiper arm 160 so as to bring the wiper roller 160 down into engagement with the neck label 152. As the bottle progresses further, the parts resume a relationship as shown in the right-hand position of Fig. 15, wherein the wiper roller 159 rides over one of the ends (155) of the neck label 152. It will be understood that, as the wiper roller 159 rides over the neck label, the abutment of arm 160 at 162 will be relieved so that the torsion spring 161 may resiliently load the wiper on the label.

As the bottle 153 clears the actuating arm 156 (see phantom outlines of Fig. 15), the actuating arm 156 becomes free to return under the influence of the torsion spring 163 to the position shown in Fig. 14, awaiting the next oncoming bottle. By this time, the wiper roller 159 will have completely pasted down the end 155 of neck label 152.

After disengaging itself from the wiper magazine 150, the bottle 153 may be advanced to a similar engagement with the actuating arm 156' of the other wiping mechanism 151, which may be located on the opposite side of the bottle path, as compared with the mechanism 150; in Fig. 14, the bottle 153' happens to be shown in this position. It will be understood that the engagement of wiper roller 159' of the mechanism 151 with the only remaining free end (154) of the neck label 152 may be completely analogous to the described cooperation in the case of the wiper mechanism 150, and that, upon emergence from the second wiper mechanism 151, the neck label 155 will have been fully pasted down, with the ends in overlapping relation. The bottle may then be received in the ejection mechanism 28, for transfer to the conveyor 20, as will be clear.

If for any reason there should be an insufficient supply of bottles to be labeled, a bottle will fail to be picked up in one of the sorting recesses 24 or 25 in the sorting wheel 23, and I provide a novel means whereby this fact may disable the label-feed mechanism, so that labels will not be wasted if there is no bottle to be labeled. Referring to Figs. 1, 2, and 3, this means may utilize an arm 165, pivoted at 166 and linked, as by a rod 167, to a trip mechanism 168. The trip mechanism (see Fig. 2) may include a bellcrank 169 with a latch member 170 carried on one arm thereof and resiliently urged as by a spring 171 into keeping engagement with an arm 172; the arm 172 may be carried for rotation with the cam-follower jack shaft 123 of the label-carriage feed mechanism. The other arm of the bellcrank 169 may be connected with the rod 167. Thus, it will be understood that the spring 171 may normally urge the bottle-intercepting arm 165 into a bottle-intercepting position.

If bottles come along the production line in the normal manner, then each bottle, such as the bottle 26, may serve to crank the arm 165 clockwise (in the sense of Fig. 3). This cranking will be against the action of spring 171 and of sufficient extent to raise latch 170 out of possible engagement with the crank 172. This unlatching operation may be timed to occur just when the label-feed cam 121 determines or is about to determine a feeding movement of the cam follower 122; the extent and duration of this unlatching movement is preferably enough to prevent latching engagement at 171–172, for the label-feed cycle governing the labels to be applied to bottle 26, once the bottle 26 has passed engagement with the arm 165. This fact will be understood to permit application of a label to the bottle 26 when it reaches the labeling station. If the production-line supply should provide an insufficient number of bottles, so that one of the sorting recesses 24—25 fails to pick up a bottle, then the arm 165 will not be actuated; latch 170 will then hold arm 172 (and therefore the label carriage 119) in the retracted position, so that regardless of the cycle of the feed cam 121, no label feed will result. The nose of the latch member 170 may be formed with a suitably inclined face so that, upon label-carriage retraction, the arm 172 may displace the latch 170 upward to reset the same on arm 172, as will be understood.

It will be seen that I have described an ingenious bottle-labeling machine wherein bottles may be handled continuously at high speed and yet labels may be applied with accuracy and precision. During the step of transferring a label to a bottle, there is no relative angular or other movement of the labels and bottles permitted, and thus there may be assurance of label alignment on the bottle whether one, two, or more labels are to be applied at the same time. Once the label is transferred to the bottle, my machine never permits any loss of control over bottle positioning or over label-positioning on the bottle. An extended wiping period is provided to assure complete and uniform adhesion of the labels in their precisely located positions; and if desired, my machine can do a neat job of pasting the ends of oversize labels in overlapping relation. Finally, my machine may be made as a complete assembly, including, if desired, a motor for the drive shaft 57, and no difficulty is encountered in merely sliding the assembly alongside a standard production-line conveyor 20; thus, if repairs should become necessary, a new unit can replace the worn unit with a minimum of downtime, and the replacement process need not occasion a lengthy shutdown of the production line, as is customary with previous machines.

While I have described my invention in detail for the preferred forms shown, it will be understood that modifications may be made within the scope of the invention as defined in the appended claims.

I claim:

1. In a machine of the character indicated, label-supporting means comprising two spaced arms for supporting spaced parts of a label therebetween, each of said arms including one portion offset from another portion, whereby one label may be supported in offset relation with another label, and gluing means comprising means to be wiped upon movement of said label-supporting means past said gluing means, said gluing means including applicators in appropriately mutually offset relation in accordance with the offset of said portions of said label supporting means.

2. In a machine of the character indicated, bottle-supporting means and label-wiping means movable relatively to each other, said label-wiping means serving to wipe an extended end of a label into firm gluing contact with a bottle, said wiping means including a wiping member poised to be resiliently urged against the label, and means to be intercepted upon a relative movement involving an approach of said bottle-supporting means to said label-wiping means, said wiping means being resiliently loaded against the label on the bottle after such interception and in wiping contact with the label for an extended angular movement around the bottle.

3. In a machine of the character indicated, label-supporting means comprising two spaced arms for supporting spaced parts of a label therebetween, each of said arms including one portion offset from another portion, whereby one label may be supported in offset relation with another label, a shaft supporting said arms, means for rotatably supporting said shaft, means for rotating said shaft, and gluing means comprising means to be wiped upon movement of said label-supporting means past said gluing means, said gluing means including applicators in appropriately mutually offset relation in accordance with the offset of said portions of said label-supporting means.

4. In a machine of the character indicated, a frame, a shaft rotatably supported therein, means for rotating said shaft, a pair of radial arms carried by said shaft in spaced-apart relation, each of said arms including one portion offset from another portion, whereby one label may be supported in offset relation with another label, applicators supported by said frame in mutually offset relation in accordance with the offset of said portions of said arms and adjacent the path of movement of said offset portions of said arms, and means for supplying adhesive to said applicators to be wiped upon said offset portions of said arms as they are moved past said applicators.

ERHARD SCHIRMER.

REFERENCES CITED

The following references are of record in the file of this patent:

UNITED STATES PATENTS

| Number | Name | Date |
| --- | --- | --- |
| 1,133,602 | Woodland | Mar. 30, 1915 |
| 1,178,608 | Weiss | Apr. 11, 1916 |
| 1,186,183 | Gaynor | June 6, 1916 |
| 1,202,466 | Woodland | Oct. 24, 1916 |
| 1,238,713 | Johnson et al. | Aug. 28, 1917 |
| 1,596,372 | Oslund et al. | Aug. 17, 1926 |
| 1,868,938 | Christensen | July 26, 1932 |
| 2,005,802 | Oslund | June 25, 1935 |
| 2,330,430 | Kantor | Sept. 28, 1943 |
| 2,545,292 | Magnusson | Mar. 13, 1951 |

FOREIGN PATENTS

| Number | Country | Date |
| --- | --- | --- |
| 507,107 | Germany | Sept. 16, 1930 |
| 79,475 | Sweden | Feb. 7, 1933 |